United States Patent [19]

Murata et al.

[11] Patent Number: 4,975,900
[45] Date of Patent: Dec. 4, 1990

[54] RESPONSE DELAY SYSTEM OF AN ISDN TERMINAL IN A POINT TO MULTIPOINT CONFIGURATION

[75] Inventors: Hatsuho Murata; Hideyuki Hirata, both of Tokyo, Japan

[73] Assignee: NEC Corporation, Tokyo, Japan

[21] Appl. No.: 388,146

[22] Filed: Aug. 1, 1989

Related U.S. Application Data

[63] Continuation-in-part of Ser. No. 43,462, Apr. 28, 1987, abandoned.

[30] Foreign Application Priority Data

May 7, 1986 [JP] Japan .................................. 61-105682

[51] Int. Cl.$^5$ ................................................ H04J 3/12
[52] U.S. Cl. .................................. 370/58.1; 370/110.1
[58] Field of Search .................... 370/58.1, 58.2, 58.3, 370/60, 85.2, 94.1, 110.1; 340/825.07, 825.52; 379/156, 161, 164, 165, 258

[56] References Cited

U.S. PATENT DOCUMENTS

| | | | |
|---|---|---|---|
| 4,379,946 | 4/1983 | Mizuno et al. .................. | 340/825.07 |
| 4,672,662 | 6/1987 | Nishino et al. ........................ | 370/96 |
| 4,722,082 | 1/1988 | Furuya et al. ..................... | 340/825.5 |
| 4,873,716 | 10/1989 | Brady .................................. | 379/165 |

FOREIGN PATENT DOCUMENTS 0154829  9/1984  Japan ............................. 340/825.08

OTHER PUBLICATIONS

"ISDN User–Network Interface Layer 3 Specification", Recommendation I.451, Selected pages of CCITT Publication, vol. III, Fascicle, 111.5, 1985.

*Primary Examiner*—Douglas W. Olms
*Assistant Examiner*—Melvin Marcelo
*Attorney, Agent, or Firm*—Helfgott & Karas

[57] ABSTRACT

An ISDN response system comprises a plurality of terminals, each of which contains a SETUP message to an incoming all. Each terminal has the same subscriber number with the same attribute values and responds to a first SETUP message received by it which has the aforementioned subscriber number and attribute values to transmit a CONN message to the termination so that communication is established between the network and the particular terminal, the CONN message of which is first received at the termination. The timing of the transmission of the CONN message sent by the particular terminal is delayed when a subsequent SETUP message is received having the same subscriber number and attribute values.

5 Claims, 5 Drawing Sheets

RESPONSE DELAY SYSTEM OF AN ISDN TERMINAL IN A POINT TO MULTIPOINT CONFIGURATION

CROSS-REFERENCE TO A RELATED APPLICATION

This application is a continuation-in-part application of application Ser. No. 043,462 filed Apr. 28, 1987, now abandoned.

BACKGROUND OF THE INVENTION

The present invention relates to a point-to-multipoint configuration wherein each terminal which is connected to a communication network may differ in the particular attributes it has stored in its memory register, and more particularly to a system for a communication terminal which has an interface which conforms to The ComitéConsultatif International Télégraphiqe et Téléphonique (CCITT) Recommendations, I. series, to respond to an incoming call.

The CCITT named a network for offering a digital communication service Integrated Service Digital Network (ISDN) and, in 1984, gave recommendations, I. series (Redbook) on basic ISDN items. These recommendations were published by the International Telecommunication Union in Geneva in 1985 as a 250 page CCITT Redbook, Volume III, Fascicle 111.5, entitled "Integrated Services Digital Network (ISDN)". This publication describes and defines the parameters and service attributes of the ISDN which are all well known and well understood by persons skilled in the telecommunication network field. These service attributes include information transfer attributes, access attributes and general attributes which are listed and defined together with their values in the CCITT recommendations 1.211 and 1.300 of this publication. These service attributes thus pertain to general accessibility of a terminal to a network call and do not include or pertain to specific communication information such as the calling party number of particular user application characteristics. In accordance with the Recommendation I. 451 (CCITT Redbook Vol. III, Fascicle III.5), on receipt of a call accept messages (SETUP) from a network, a terminal compares certain values of its own attributes with those of the service attributes of the call which are contained in the SETUP message and thus makes an attribute compatibility check in order to decide whether or not to respond to the call and, only when it has decided to respond, sends a respond message CONNect (CONN) to the network.

A more specific procedure is as follows.

A message sent from a network to a terminal for connection is called a SETUP message. The SETUP includes various kinds of information elements such as protocol discriminator, call reference, message type, bearer capability, channel identification, progress indicator, terminal capabilities, display, keypad, signal, switchhook, calling party number, calling party subaddress, called party number, called party subaddress, transit network selection, low layer compatibility, high layer compatibility, user-user information (Rec. I.451, pages 274 and 275). Certain of these information elements, namely bearer capability, and, if necessary, low layer compatibility, high layer compatibility and user-user information are service attributes which may be used for compatibility checking which the terminal performs in order to decide whether it may answer a call arrived (Rec. I.451, pages 288, 307, 308, 314). The terminal has therein a classified table of its own attributes and values, namely the contents of the above-stated bearer capability, low and high layer compatibility and user-user information elements with which it is compatible. The terminal decides whether it may accept an incoming call by comparing the contents of a call message arrived with those stored in this classified table. The remaining information elements listed above are not used or involved in this compatibility checking.

Referring to FIG. 1, assume that a customer premises 20 which is incorporated in an ISDN network 10 includes a point-multipoint bus 22 which is connected to the network 10 via a network termination (NT) 21, that a plurality of terminals (TE) 23, 24, . . . , and 2n are present on the bus 22, and that the terminals 23, 24, . . . , and 2n share a single subscriber number and have no sub-address.

In the case of a prior art response system (FIG. 2) as prescribed by the Recommendation I.451, a SETUP message is broadcast from the network 10 to the terminals 23, 24, . . . , and 2n. As mentioned above, the SETUP includes various kinds of information elements. Among such information elements, the bearer capability, low layer compatibility, high layer compatibility and user-user information are used for compatibility checking which the terminal performs for deciding whether it may answer a call arrived (Recommendation I.451 4.5.5, pages 288–292; 4.5.15 page 307; and 4.5.18 page 308). These information elements other than the bearer capability are omitted, as the case may be. Each of the terminals 23, 24, . . . , and 2n has therein a classified table which is set own attributes and values.

Let us assume that the terminals 23 and 25 are facsimile machines with same attributes and values, and the terminal 25 is added color transfer mode. The code for the color transfer mode is not defined yet. And the internal processing speed of the terminal 25 is slower than that of the terminal 23.

Each of the terminals 23, 24, . . . , and 2n receives the SETUP message and checks the message so as to identify the requested bearer service functionality. If the terminals 23 and 25 find matches between the requested bearer service attributes and their own, each of the terminals 23 and 25 returns a message for wishing to take the call (CONN message) to the network 10. Then the network 10 sends connect acknowledge (CONN ACK) message to that terminal 23 which has returned the CONN message first to allow the terminal 23 and not the terminal 25 to answer the call.

A problem with such prior art response system is that the terminal 23 should always return a CONN message before the terminal 25. Therefore a calling user would be incapable of communicating with a terminal 25 even though it might repeat origination of a call for a number of times.

SUMMARY OF THE INVENTION

An object of the present invention is, therefore, to provide in a communication network having a plurality of terminals which share a single subscriber number, a response delay system of a communication terminal to an incoming call which allows a calling user to communicate with a desired one of the terminals without fail.

Another object of the present invention is to provide an improved response system of a communication terminal to an incoming call which varies the period of time by which the return of a CONN message is delayed, every time the terminal receives a message so that CONN messages from a plurality of terminals are prevented from conflicting, i.e., the CONN messages are received by a network at different time points.

A response system of a terminal to an incoming call of the present invention include means for storing a calling party number and attribute values of a call originated by the calling party when that call is not meant for the terminal, and means for delaying a timing for sending a response message in response to a subsequent incoming call which bears the same calling party number and the same attribute values.

BRIEF DESCRIPTION OF THE DRAWINGS

The above and other objects, features and advantages of the present invention may be fully understood from the following detailed description and accompanying drawings, wherein.

In the drawings, the same reference numerals represent the same structural elements.

DESCRIPTION OF THE PREFERRED EMBODIMENT

Figure 1:
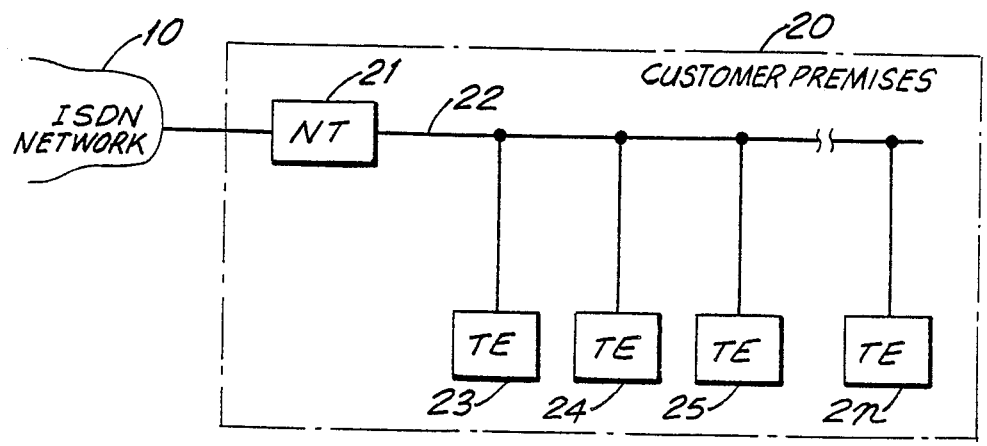
FIG. 1 is a schematic diagram showing a system construction to which the present invention is applicable.
Figure 2:
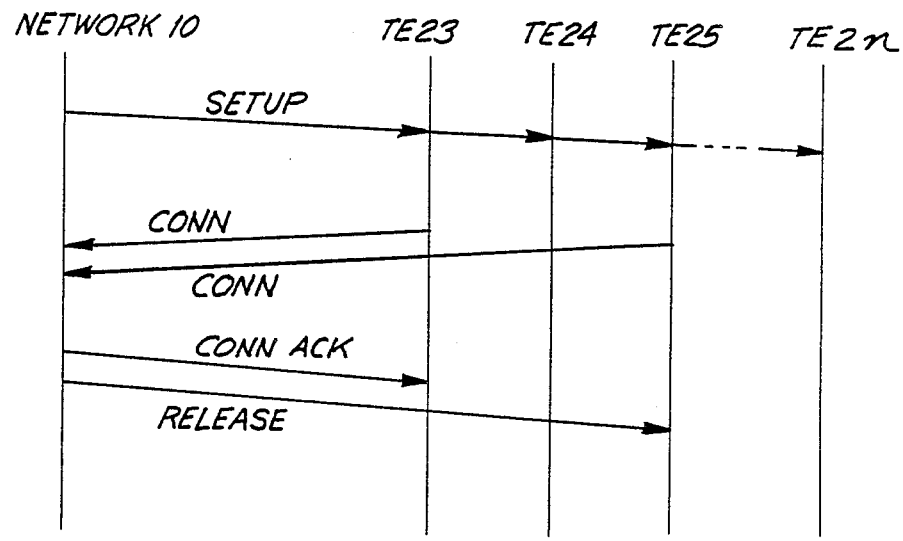
FIG. 2 is a sequence diagram representative of message interchange between communication network and terminals.
Figure 3:
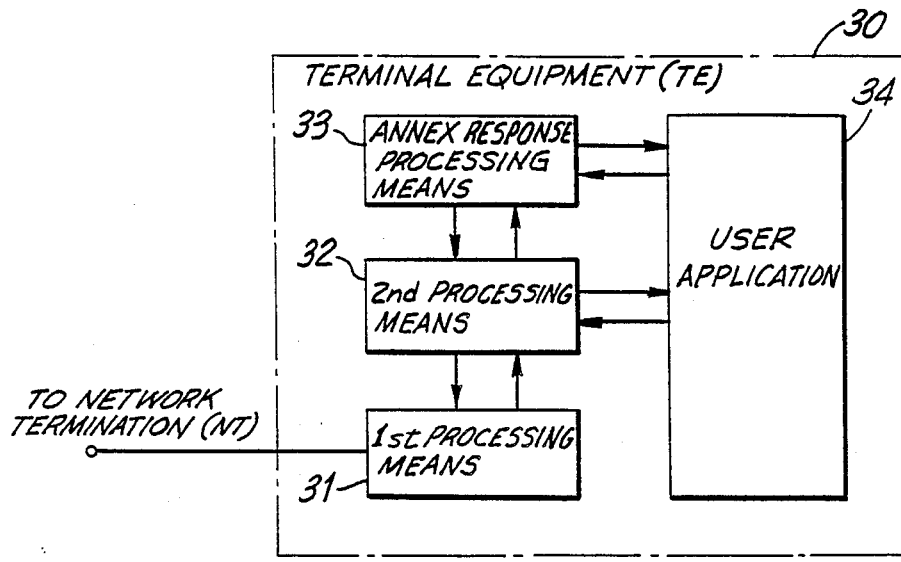
FIG. 3 is a block diagram showing one embodiment of the present invention.

Referring to FIG. 3, a terminal equipment (TE) 30, to which the present invention is applied, generally comprises a first processing means 31 which is made up of Layer 1 controller for matching an interface adapted for physical physical connection and for performing electrical control for bit transmission, and a Layer 2 controller for deciding whether a link is normally usable through, for example, error detection and parity check; a second processing means 32 to which are assigned Layer 3 processing such as state display information processing associated with call origination, response, disconnection and others, and selection control information processing associated with dial enabling, process display, dial number, communication class and others; an annex response processing means 33, the details of which will be described later; and a user application means 34 which include a user application and an operation/maintenance application comprising the various programs for operating the terminal. The first processing means 31, the second processing means 32 and the user application 34 are all conventional and well known components of ISDN terminals.

Figure 4:
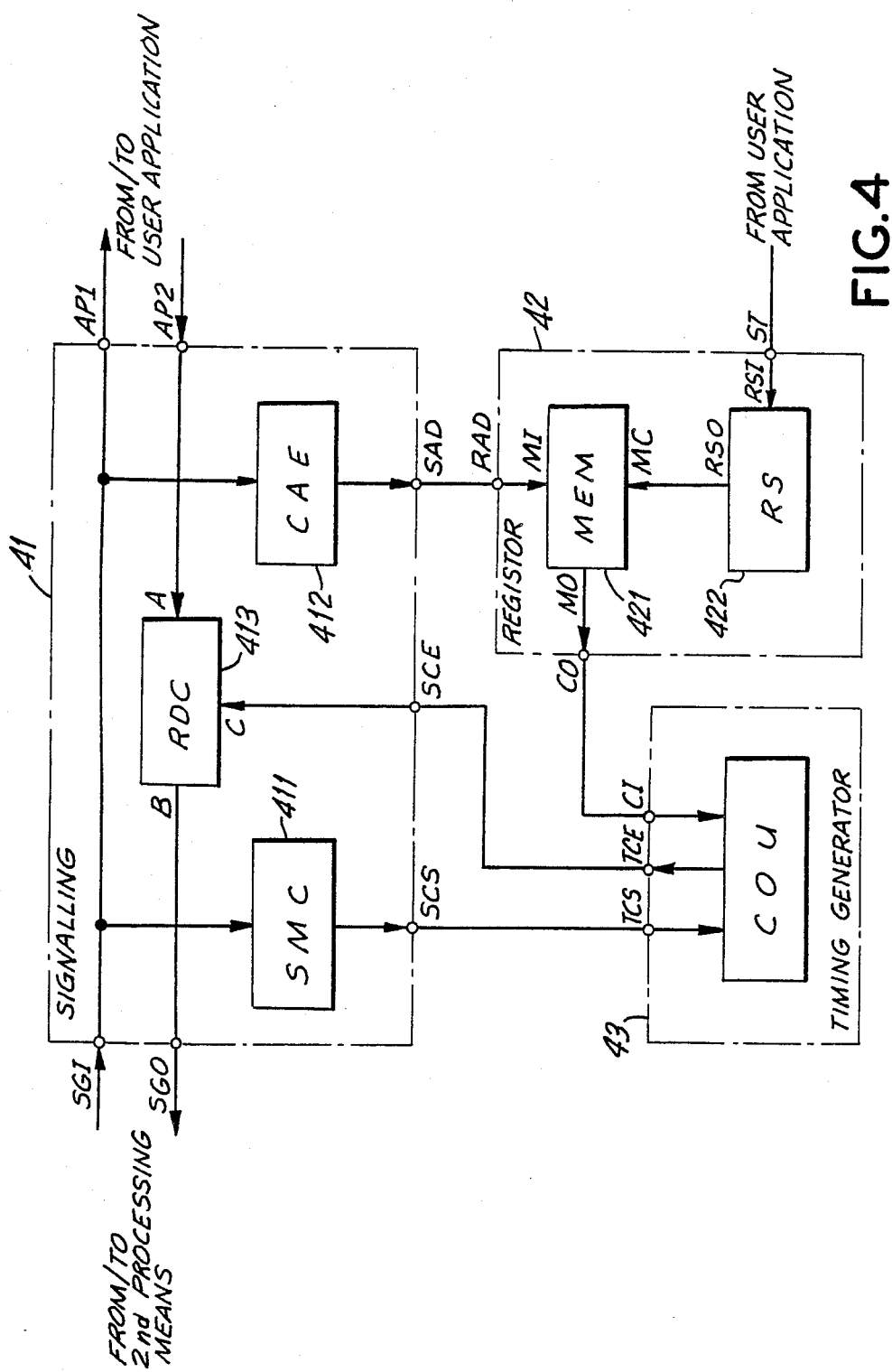
FIG. 4 is a detailed diagram of one embodiment of the invention.

As shown in FIG. 4, the annex response processing means 33 includes a signalling means 41, a register 42, and a timing generator 43. The signalling means 41 is connected to a signalling section of a digital access signalling input/output terminal SG (SGI and SGO), while being connected to the user application 34 of the TE 30 via an application terminal AP (API and AP2). Further, the signalling means 41 is connected to a count-up terminal TCE of the timing generator 43 via a count-up terminal SCE. The timing generator 43 is connected to a count start terminal SCS of the signalling means 41 via a count start terminal TCS, and to a control output terminal CO of the register 42 via a control input terminal CI. The register 42 is connected to the user application 34 via a state input terminal ST, and to a number-information output terminal SAD of the signalling means 41 via a number-information input terminal RAD In detail, the signalling input terminal SGI of the signalling means 41 is connected to a SETUP message comparator (SMC) 411. The output of the SMC 411 is delivered via the count start terminal SCS. The input terminal SGI is also connected to a calling party number and attribute value extractor (CAE) 412. The output of the CAE 412 which is a conventional unit, is delivered via the number-information output terminal SAD. On the other hand, the signalling input terminal SGI is connected to the application terminal API. The count-up terminal SCE is connected to an input terminal C of a CONN message transmission delay means (RDC) 413. The RDC 413 also has an input terminal A connecting to the application terminal AP2, and an output terminal B connecting to the signalling output terminal SGO.

The register 42 includes a memory (MEM) 421, and a register command and waiting time subtracter (RS) 422. The RAD is connected to an input terminal MI of the MEM 421. The state input terminal ST which receives a signal to drive MEM 421 from the user application 34 (FIG. 3) is connected to an input terminal RSI of the RS 422. The RS 422 has an output terminal RSO connecting to a control input terminal MC of the MEM 421. An output terminal MO of the MEM 421 is connected to the control output terminal CO of the register 42.

Figure 5:
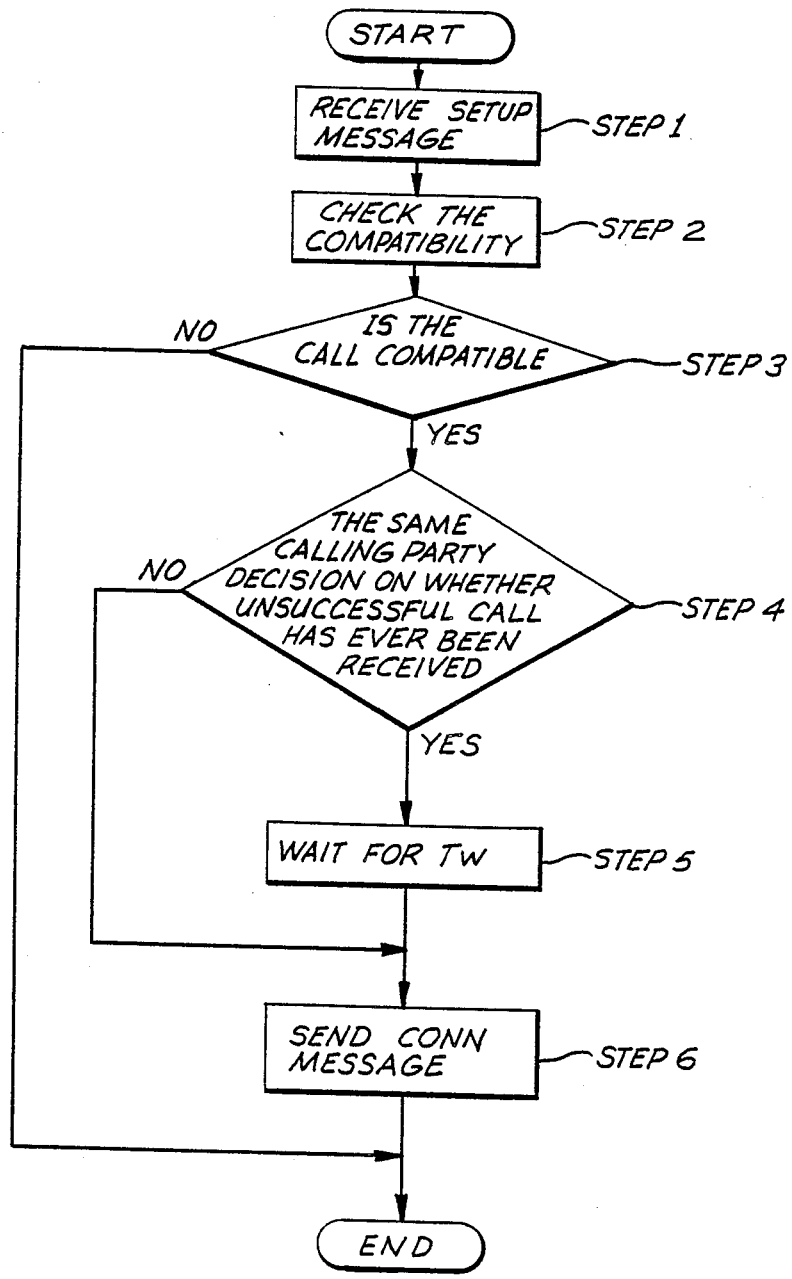
FIG. 5 is a flowchart demonstrating a sequence of steps which occur on arrival of a call in accordance with one embodiment of the present invention.

The response of the TE 30 to an incoming call will be described in detail with reference to FIGS. 4, 5 and 6. It is to be noted that the operation which will be described also applies to all the other terminal equipment.

A SETUP message from a network is applied to the signalling means 41 via the signalling input terminal SGI. The contents of the message are reported to the user application 34 (FIG. 3) via the application terminal API. Simultaneously, when the SMC 411 of the signalling means 41 decides that the SETUP message has been received, the signalling means 41 delivers a count start command to the count start terminal TCS of the timing generator 43 via the count start terminal SCS (FIG. 7, STEP 1). This is represented by a time A in FIG. 6, i.e., a SETUP message receipt time. The CAE 412 of the signalling means 41 checks the fields of the calling party number and attribute values of the call from the SETUP message. The attribute values include an information transfer mode, an information transfer rate, an information transfer capability, etc., as defined in the above referenced Rec. 1.451. Then the CAE 412 feeds the calling party number and attribute values to the number-information input terminal RAD of the register 42 via the number-information output terminal SAD. Through analyzing the contents of the SETUP message, the user application 34 performs compatibility checking, i.e., it compares "bearer capability" and, if necessary, "low layer compatibility", "high layer compatibility" and "user-user" information elements with those of the own terminal TE 30 (STEP 2). The compatibility checking is defined in the above-reference CCITT Recommendation I.451. The user application 34 comprises many programs to operate the TE 30. When it is decided that the call is compatible with the TE 30 (STEP 3), the user application 34 delivers a respond command to the application terminal AP2.

The calling party number and the attribute values of the call extracted from the present message by the CAE 412 are applied to the MEM 421 of the register 42 via the terminal MI to be compared with those which were stored at the end of the last call arrival, whereby it is decided whether a call of the came contents and originated by the same calling party has ever been an unsuccessful call received (STEP 4). Only under the condition wherein the decision shows that the call arrived is incompatible, that a communication in the event of receipt of the last call was unsuccessful is reported from the user application 34 to the RS 422 via the state input terminal ST, and the output of the RS 422 is fed to the input terminal MC of the MEM 421, the MEM 421 delivers a waiting-time set signal n to the input terminal CI of the timing generator 43 via the terminal MO and CO. The waiting-time set signal n is incremented by one every time a SETUP message which bears the number of the same calling party number and the same attribute values arrives at the TE 30, while being reset to zero when the TE 30 has actually accepted a call.

When no waiting-time set signal n arrives at the timing generator 43, i.e., when the signal n is zero, the timing generator 43 immediately sends a count-up signal to the terminal SCE of the signalling section 41 via a count-up terminal TCE.

When the RDC 413 of the signalling means 41 receives on its terminal A a response signal which is applied to the means 41 from the user application 34 via the terminal AP2 and, at the same time, on its terminal C a count end signal which is delivered to the means 41 from the timing generator 43 via the terminal SCE, the RDC 413 returns a CONN message to the network 10 via the terminals B and SGO (STEP 6). In FIG. 6, a time B is the shortest possible response time, and the interval between the time A and the time B is the shortest response interval $T_{MIN}$.

Assume that the waiting-time set signal n is fed from the MEM 421 of the register 42 to the CI of the timing generator 43. Then, the timing generator 43 executes waiting time processing by one of two predetermined methods as follows. The first method is incrementing the waiting time $T_W$ every time an incompatible call arrives and, thereby, delaying a response until a maximum period of time $T_{MAX}$ which the network 10 allows expires. Such a procedure is expressed as $$T_W = T_{MIN} + n \leq T_{MAX} \quad (1)$$

where is a representative of a unit change off the response interval. The timing generator 43 counts time according to the equation (1) on the basis of the waiting-time set signal n which is fed from the MEM 421 and, on the expiry of the waiting time $T_W$ feeds a count-up signal from its count-up terminal TCE to the terminal SCE of the signalling means 41.

The second method is setting the waiting-time $T_W$ as represented by the following equation:

$$T_W = T_{MAX} - n \cdot \Delta \quad (2)$$

Figure 6:
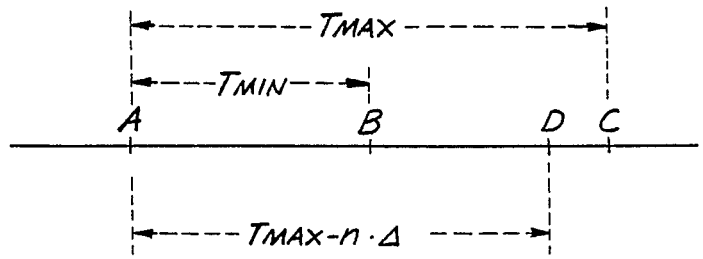
FIG. 6 is a response timing chart.
Figure 7:
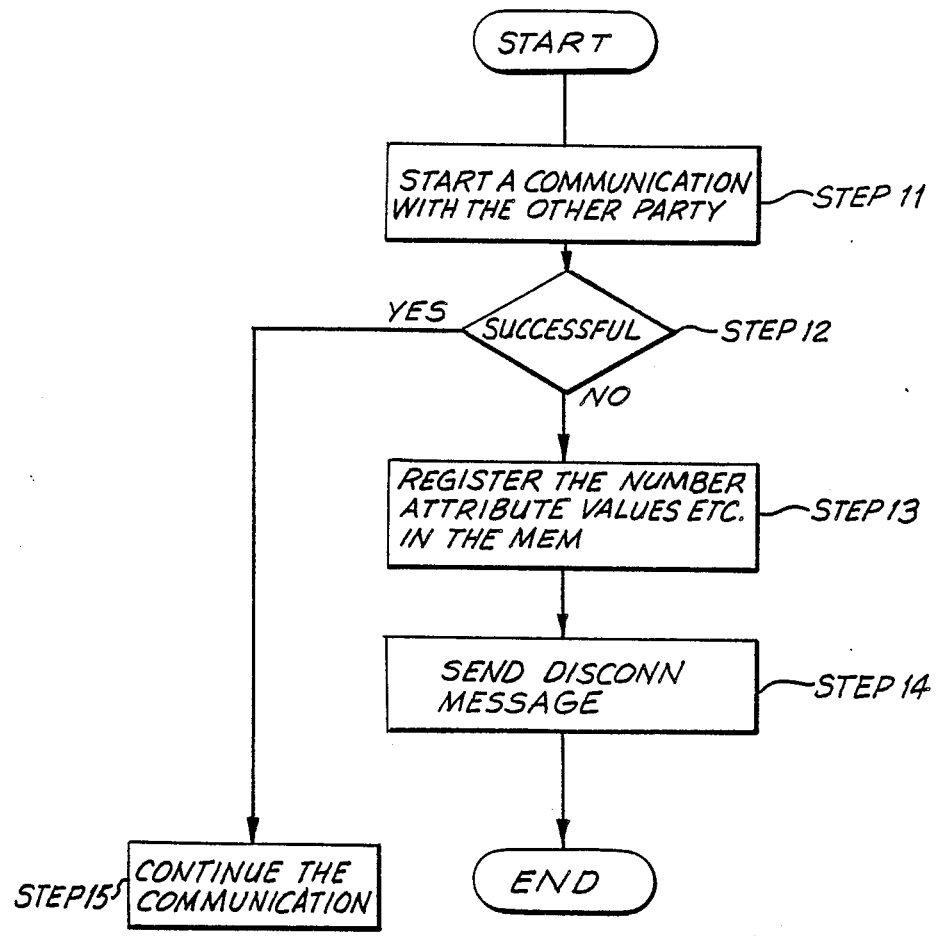
FIG. 7 is a flowchart demonstrating processing which occurs after the start of a communication.

On receipt of the waiting-time set signal n, the timing generator 43 delivers a count-up signal via its count-up terminal TCE to the terminal SCE of the signalling means 41 at a time when the period of time elapsed since the count start time A of FIG. 6 reaches the equation (2), e.g., a time D.

When the response command from the user application 34 is fed to the input terminal A of the RDC 413 of the signalling means 41 and the count-up signal is fed to the input terminal C, the RDC 413 returns a CONN message from its output terminal B to the network 10 via the signalling output terminal SGO (STEP 6).

In the above construction, when the TE 30 is to accept a call for the first time, it will return a CONN message on the expiration of the minimum period of time $T_{MIN}$. On the other hand, when a call received is not meant for the terminal TE, even though the calling party may call again indicating the same attribute values, a CONN message for that call is delayed and, hence, any other terminal which is returning a CONN message is allowed to accept the call.

Referring to FIG. 7, processing subsequent to the start of a communication is executed as follows. After the establishment of a communication link with the calling party (STEP 11), whether the communication is successfully implemented is determined by the user application (STEP 12). The successful communication means that a communication link between calling party and a called party is established, and applications including the characteristics and/or programs of both parties are matched. The unsuccessful communication, in turn, means that a communication link between a calling party and a called party is established, while the applications of those parties are not matched. If the applications of the calling and called parties are not matched the communication will not be successfully accomplished.

If the communication is successful, it is continued without interruption (STEP 15). If the communication is unsuccessful, the number, attribute values and others of the calling party which have been extracted by the CAE 412 and stored into the MEM421 at the beginning of the communication as previously stated, are registered in the MEM421 according to a command given by the user application 34 via the terminal ST (STEP 13). Further, the user application 34 invokes a disconnect (DISC) message delivering command to the second processor means 32, FIG. 3 so as to clear the call.

While particular embodiments of the present invention have been shown as described, it will be obvious to those skilled in the art that changes and modifications may be made without departing from the invention in its broader aspects. Therefore, the aim in the appended claims is to cover all changes and modifications as fall within the true spirit and scope of the invention. The matter set forth in the foregoing description and accompanying drawings is offered by way of illustration only and not as a limitation. The actual. scope of the invention is intended to be defined in the following claims when viewed in their proper perspective based on the prior art.

What is claimed is:

1. A response system of a communication network terminal to an incoming call containing a SETUP message, comprising a plurality of terminals which share a single subscriber number,
   each of said terminals comprising :
   means for storing at least a calling party number and attribute values in the SETUP message of a call originated by said calling party and received by said terminal, when said call is not successfully implemented by said terminal; and means connected to said storing means for delaying a timing for sending a response message on receipt of a subsequent call which bears the same calling party number and the same attribute values.

2. A response system of a communication network terminal to an incoming call containing a SETUP message, comprising a plurality of communication terminals which share a single subscriber number, each of said terminal comprising:

responding means for a response message when attribute values of and attribute values included in a received SETUP message which bears the subscriber number of said communication terminal are identical with each other, and means for enabling said responding means to respond at a time when a period of time, produced by subtracting from a predetermined period of time a period of time which is prolonged according to a frequency of occurrence of failure of connection after transmission of a response message from said communication terminal, expires since a .time of arrival of a message at said communication terminal.

3. A method of utilizing a terminal response system with an integrated system digital network wherein call acceptance SETUP messages are supplied to the response system via a network termination from the network, each SETUP message including selected calling and called subscriber numbers and attribute values and wherein connection acknowledgement CONN messages are sent from the response system to the network via the termination, said system including a plurality of terminals, each terminal having the same subscriber number with the same attribute values and no subaddress, each terminal responding to the first SETUP message received by it which has said number and attribute values to transmit a CONN message to the termination whereby a communication link is established between the network and the particular terminal whose CONN message is first received at the termination, said method comprising the steps of:

(a) determining, at said particular terminal, whether the communication link has been established and the communication has been successfully or unsuccessfully carried out;

(b) continuing said communication without interruption when the communication is successfully carried out, and when the communication is completed, sending a disconnect signal to the network and clearing the call;

(c) storing the calling subscriber number and attribute values in the particular terminal when the communication has not been successfully carried out, and sending a disconnect signal to the network and clearing the call; and delaying the timing of the transmission of the CONN message sent by said particular terminal when a subsequent SETUP message is received having the same subscriber values.

4. The response system of claim 1, wherein said means for delaying a timing for sending a response message is operative every time a call which bears the same calling party and the same attribute values is received subsequently, and said delay is up to a period of time which said communication network allows.

5. In an Integrated System Digital Network (ISDN) having a plurality of terminals which share a single subscriber number and which receive the same SETUP messages including a calling number and attribute values, a response system in each terminal comprising;

compatibility checking means for determining the compatibility of the terminal with the attribute values included in the SETUP messages, message responding means connected to said compatibility checking means for delivering a communication-link-permitting response to the network if compatibility is determined for a particular call, memory means for storing the calling number and attribute values included in the SETUP message of said particular call if said communication link is established but the communication is not successfully carried out with said terminal, and time delaying means connected to said memory means and said message responding means for delaying said communication-link-permitting response if a subsequent SETUP message is received by the terminal having the same calling number and attribute values, whereby a communication link may be established with a different terminal among said plurality of terminals.

* * * * *